P. R. McCRARY.
ICE MAKING APPARATUS.
APPLICATION FILED OCT. 3, 1904.
983,508.
Patented Feb. 7, 1911.
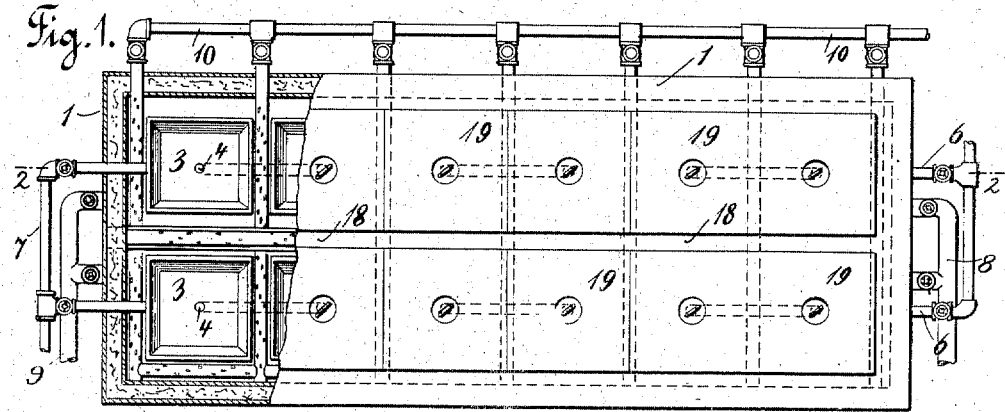
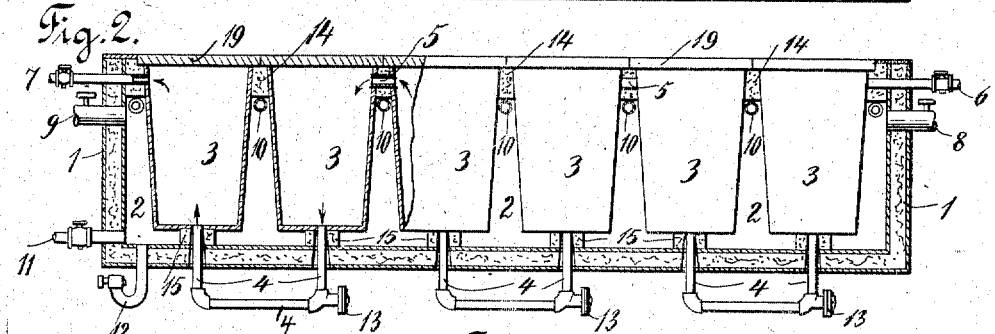
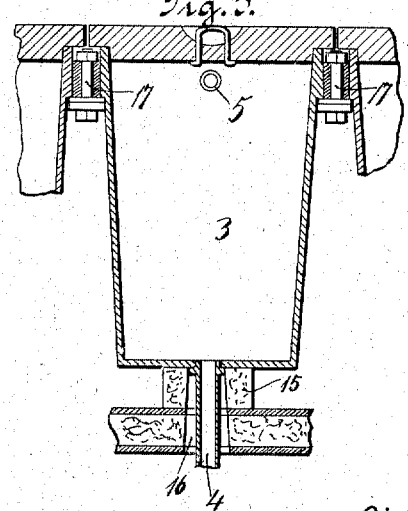
Witnesses
Max B. A. Doring
James T. Duhamel
Pierce R. McCrary
Inventor
By his Attorney

UNITED STATES PATENT OFFICE.

PIERCE R. McCRARY, OF PHILADELPHIA, PENNSYLVANIA.

ICE-MAKING APPARATUS.

983,508.

Specification of Letters Patent. Patented Feb. 7, 1911.

Application filed October 3, 1904. Serial No. 227,058.

*To all whom it may concern:*

Be it known that I, PIERCE R. McCRARY, a citizen of the United States, and resident of Philadelphia, in the county of Philadelphia and State of Pennsylvania, have invented certain new and useful Improvements in Ice-Making Apparatus, of which the following is a specification.

This invention relates to ice making apparatus and has in view the production of ice in stationary containers, abolishing the necessity of removing and replacing such containers.

It further has in view the production of transparent ice without distillation of the water used and without employment of stirrers in the ice containers, all as will more fully appear from the detailed description, the claims and the drawing in which—

Figure 1 is a plan of the apparatus embodying my invention. Fig. 2 a section on line 2—2 of Fig. 1. Fig. 3 is a detail view of a container.

In the figures 1 represents a tank preferably supplied with an insulating packing. The lower portion of the tank 2 constitutes an air tight cooling compartment surrounding the ice cans or containers 3, 3, which containers communicate below through the pipes 4, 4 and above through openings in the sides, 5, 5.

6 is an inlet pipe for water and 7 is an outlet pipe for water.

8 is an inlet pipe for air and 9 is an outlet pipe for air.

10, 10 are spray pipes to spray solution of calcium chlorid against the sides of the containers and 11 is an outlet pipe for the calcium chlorid solution.

12 is a drip pipe for moisture condensed from air used to thaw the ice formed in the containers 3, so as to become loose and rise to the top of the water covering it.

13 are diaphragms of rubber or other elastic material to allow an expansion of the water in the pipes after the ice in the containers has frozen solid, when no upward expansion is admitted.

14 represents insulating material such as cork, placed between the upper portions of the containers, and 15 represents like material surrounding the outlet pipes 4 at the bottom of the containers. The outlet pipes are still further protected against freezing by the air channel 16, (Fig. 3) between the pipes and the insulating material 15.

17 (Fig. 3) are rods from which the containers 3, 3 are suspended.

18 are partitions separating one compartment from another.

19 is a cover for an ice container.

The operation of the apparatus is as follows. Water is introduced through the pipe 6 until it overflows through the pipe 7. Cold air is then passed in through the pipe 8 and out through the pipe 9 water circulating through the containers of the tank until the ice is frozen solid in some of the containers when the circulation is stopped and the freezing is completed while the water in the containers is quiescent. Cold calcium chlorid solution is sprayed the same time the current of cold air is passed through the compartment 2. By the combined action of the spray of cold calcium chlorid solution and cold air the period of freezing is very much shortened. After the freezing, air above the freezing point is passed through the compartment 2, through the inlet pipe 8 and the outlet pipe 9. This air current is continued until the blocks of ice have thawed enough to become loosened and float on the top of the water in the containers. The insulating material 14 serves to prevent ice forming at the upper portion of the containers 3, and the insulating material 15 and the air channel 16 serve to prevent the water in the pipes 4 from freezing. After the freezing on the four sides of a container has proceeded so far that the faces of ice meet and unite, a current of water can no longer be passed through the containers 3. This closing of the ice block may serve as an automatic means for cutting off the current of water passing through the containers 3, or this current may be stopped arbitrarily when the freezing has preceeded to a certain point, for instance when ice blocks have reached a size about four fifths of the size of the finished blocks. After the faces of ice on the four sides have united the further formation of ice on the lower part of the block will cause an expansion, and this expansion would burst the pipes 4 unless provision was made to furnish increased room for the contained water. This is done by the elastic diaphragms 13.

Inasmuch as the containers in which the ice is frozen are stationary, the time and labor required to remove and replace the same is saved. By the circulation of the water, transparent ice is formed without distilling the water and without maintaining stirrers in operation in the indivdual ice containers or cans, which involves much labor and inconvenience.

What I claim as new is:

1. In refrigerating apparatus the combination of an inclosing casing, water containers located in the casing and communicating with each other and means for causing water to flow continuously in one direction from one container to another throughout the series while ice is being formed.

2. The combination of an inclosing casing, water containers located in the casing, said containers being alternately connected at the tops and bottoms.

3. The combination of a plurality of water containers communicating with each other, an air tight compartment surrounding the lower portion of the containers, means for insulating the upper portion of the containers and means for bringing a cooling medium into contact with the lower portion of the container.

4. The combination of a plurality of water containers communicating with each other, means for causing water to flow continuously in one direction from one container to another throughout the series, an air tight compartment surrounding the lower portion of the containers, and means for passing a current of cold air through this compartment.

5. The combination of an inclosing casing, water containers located in the casing, said containers being alternately connected at the tops and bottoms, pipes at the bottoms of the containers and insulating material surrounding the pipes.

6. The combination of an inclosing casing, water containers located in the casing, a pipe connecting the bottom of one container with the bottom of another container and a diaphragm in said pipe adapted to yield to the pressure of the water caused by ice formation in the water containers.

Signed at Philadelphia in the county of Philadelphia and State of Pennsylvania this 13th day of September A. D. 1904.

PIERCE R. McCRARY.

Witnesses:
C. A. O. ROSELL,
DAVID A. HAMMOND.